(12) United States Patent
Goode et al.

(10) Patent No.: US 6,211,310 B1
(45) Date of Patent: Apr. 3, 2001

(54) MANUFACTURE OF STEREOREGULAR POLYMERS

(75) Inventors: Mark Gregory Goode, Hurricane; Clark Curtis Williams, Charleston, both of WV (US); Timothy Roger Lynn, Hackettstown, NJ (US); Robert Converse Brady, III, Houston, TX (US); Jody Michael Moffett, Charleston, WV (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/194,988
(22) PCT Filed: May 6, 1997
(86) PCT No.: PCT/US97/10059
 § 371 Date: Jun. 2, 1999
 § 102(e) Date: Jun. 2, 1999
(87) PCT Pub. No.: WO97/46599
 PCT Pub. Date: Dec. 11, 1997

(51) Int. Cl.$^7$ ........................................ C08F 2/34
(52) U.S. Cl. .......................... 526/88; 526/160; 526/351; 526/901; 526/943; 502/9; 502/152
(58) Field of Search ..................... 526/160, 901, 526/348, 68, 69, 70, 62, 66, 943, 904, 351

(56) References Cited

U.S. PATENT DOCUMENTS

| | | | |
|---|---|---|---|
| 5,317,036 | 5/1994 | Brady et al. | 523/223 |
| 5,453,471 | 9/1995 | Bernier et al. | 526/68 |
| 5,462,999 | 10/1995 | Griffin et al. | 526/68 |
| 5,693,727 | * 12/1997 | Goode et al. | 526/86 |
| 5,962,606 | * 10/1999 | Williams et al. | 526/88 |

FOREIGN PATENT DOCUMENTS

| | | |
|---|---|---|
| 0584609 | 3/1994 | (EP) . |
| 0659773 | 6/1995 | (EP) . |
| 0764665 | 3/1997 | (EP) . |

* cited by examiner

Primary Examiner—David W. Wu
Assistant Examiner—R. Harlan
(74) Attorney, Agent, or Firm—P. A. Doody; P. W. Leuzzi

(57) ABSTRACT

The present invention teaches the use of particular soluble metallocene catalysts to produce stereoregular polymers in gas phase polymerizations wherein the catalysts are fed into a particular lean zone in the reactor. The metallocene catalysts are bridged bis(substituted indenyl) compounds.

10 Claims, 1 Drawing Sheet

MANUFACTURE OF STEREOREGULAR POLYMERS

FIELD OF THE INVENTION

The present invention relates to the use of an unsupported metallocene catalyst for the polymerization of stereoregular olefins in the gas phase.

BACKGROUND OF THE INVENTION

U.S. Pat. No. 5,504,232 to Winter et al. teaches that bridged substituted bis-indenyl type metallocene complexes may be used to polymerize propylene to produce a stereoregular polymer, but given the inventors' later work as disclosed in Spalek et al., "The Influence of Aromatic Substituents on the Polymerization Behavior of Bridged Zirconocene Catalysts, *Organometallics* 1994, 13, 954–963, it is not clear whether such stereoregularity is transferable outside the specific conditions of the slurry phase since solvent effects may play a large role in the polymerization. Additionally, appropriate conditions for polymerizing outside of the liquid phase are not taught.

U.S. Pat. No. 5,317,036 teaches the gas-phase polymerization of olefins with catalysts in liquid form. However, when a liquid catalyst is employed in gas phase polymerization, several phenomena can occur. First, the catalyst tends to deposit on the polymer forming the fluidized bed which in turn leads to accelerated polymerization on the surface of the particles of the bed. As the coated resin particles increase in size, they are exposed to a higher fraction of catalyst solution or spray because of their increased cross-sectional dimensions. If too much catalyst is deposited on the polymer particles, they can grow so large that they cannot be fluidized thereby causing the reactor to be shut down.

Second, using liquid catalyst under conditions of high catalyst activity, e.g., a liquid metallocene catalyst, the initial polymerization rate is often so high that the newly formed polymer particles can soften or melt, adhering to larger particles in the fluidized bed which can cause reactor shutdown. On the other hand, if the polymer particles size is too small, entrainment can occur resulting in fouling of the recycle line, compressor, and cooler and increased static electricity leading to sheeting can result.

However, there is no specific teaching as to the manufacture of a stereoregular polymer, such as isotactic polypropylene (iPP) and the conditions required to achieve same.

SUMMARY OF THE INVENTION

The present invention teaches the use of particular soluble metallocene catalysts to produce stereoregular polymers in gas phase polymerizations wherein the catalysts are fed into a particle lean zone in the reactor. The metallocenes catalysts are bridged bis-(substituted indenyl) compounds.

DETAILED DESCRIPTION OF THE INVENTION

Figure 1:
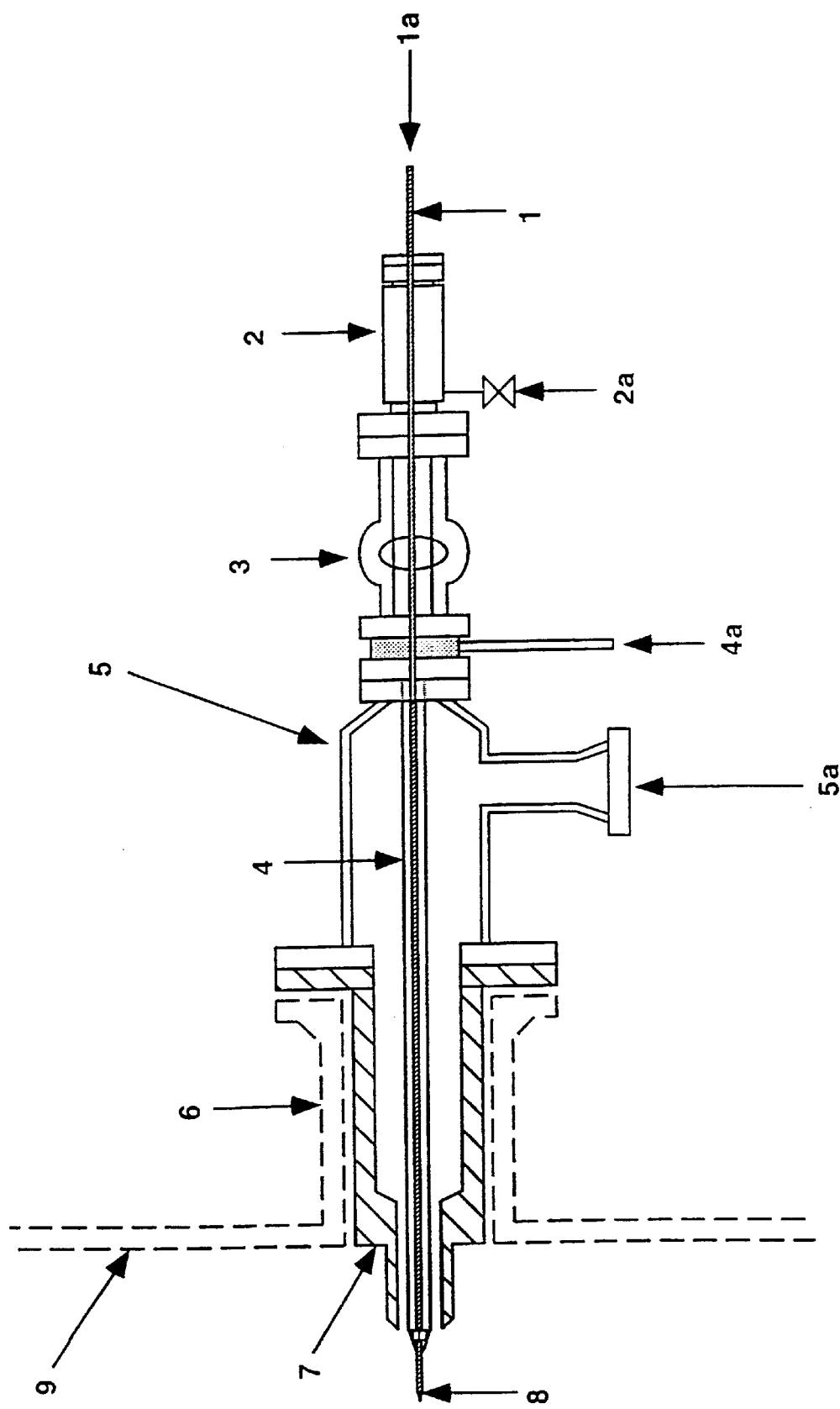
FIG. 1 represents an exemplary catalyst feeding mechanism of the present invention.

The present polymerization system has particular advantages, including, ease of catalyst preparation, elimination of catalyst deactivation by the support, exclusion of inorganic support material residues in the product and the absence of oil from the slurrying a supported catalyst.

Two of these advantages are of particular importance for stereoregular polymers. Fibers are a very important application for stereoregular polymers. Inorganic support material residues in the product diminish fiber properties substantially. Therefore, any inorganic support material residues must be filtered from the product more extensively than for other polyolefin applications. Eventually the filters plug and must be cleaned. Filter cleaning causes equipment downtime and expense. Catalysts that do not contain a support do not have this problem.

Products that contain oils result in smoke during extrusion. Supported metallocene catalysts are typically stored and fed to the reactor as very dilute mineral oil slurries. Oil renders the supported catalyst non-pyrophoric and results in safer catalyst handling considerations. Dry supported metallocene catalysts are highly pyrophoric since the cocatalysts usually have very high surface area when it is placed on a support and the solvent is removed. In addition, concentrations of cocatalyst and metallocene on the support are limited by the pore volume of the support. Due to the large quantity of cocatalyst required to activate metallocene to an optimum activity, the metallocene concentration on the support is very low. Therefore, the metallocene concentration in the oil slurry is extremely low and this results in high concentrations of oil in the product.

Catalyst

Metallocenes are organometallic coordination complexes of one or more π-bonded moieties in association with a metal atom from groups III to VIII or the rare earth metals of the Periodic Table. The metallocene catalysts for use herein are of the formula:

wherein M is a metal from groups III to VIII or a rare earth metal of the Periodic Table; L is π-bonded substituted indenyl ligand coordinated to M; $R^1$ is a bridging group selected from the group consisting of $C_1$–$C_4$ substituted or unsubstituted alkylene radicals, dialkyl or diaryl germanium or silicon groups, and alkyl or aryl phosphine or amine radicals; each X is independently hydrogen, an aryl, alkyl, alkenyl, alkylaryl, or arylalkyl radical having 1–20 carbon atoms, a hydrocarboxy radical having 1–20 carbon atoms, a halogen, $NR^2_2$—, $R^2CO_2$—, or $R^2_2NCO_2$—, wherein each $R^2$ is a hydrocarbyl group containing 1 to about 20 carbon atoms; and z is the valence state of M.

Illustrative, but non-limiting, examples of metallocenes are bridged dialkyl indenyl metallocenes [e.g., $(indenyl)_2M(CH_3)_2$, $(indenyl)_2M(C_6H_5)_2$, $(indenyl)_2M$ di-neopentyl, $(indenyl)_2M$ di-benzyl]; bridged mono alkyl bisindenyl metallocenes, [e.g., $(indenyl)_2M(CH_3)Cl$, $(indenyl)_2M$ neopentyl Cl, $(indenyl)_2MC_6H_5Cl$], indenyl metal di-halide complexes [e.g., $indenyl_2MCl_2$, $tetra$-methylindenyl$_2MCl_2$, tetra-ethylindenyl$_2MCl_2$, bis(2,4 dimethyl-indenyl)$MCl_2$]; bisfluorenyl structures [e.g., bisfluorenyl$MCl_2$, bis-nona methyl fluorenyl$MCl_2$, bis-1-methyl fluorenyl$MCl_2$]; with the following bridging groups (i.e., R in the above formula I): $Me_2Si$, $Et_2Si$, $Ph_2Si$, MePhSi, MeEtSi, EtPhSi, $Me_2Ge$, $Et_2Ge$, $Ph_2Ge$, MePhGe, MeEtGe, MeCH, $Me_2C$, $Et_2C$, $Ph_2C$, MePhC, MeEtC, EtPhC, $iPr_2C$, $t$-$Bu_2C$, ethylene, tetramethylethylene, diphenyl ethylene, methyl ethylene, propylene, methylamine, butylene, and methyl phosphine.

Particularly preferred for use herein is racemic-dichloro [(dimethylsilylene)bis (1,2,3,3a,7a-η)-2-methyl-4-phenyl-1H-inden-1-ylidene] zirconium (hereinafter "SIZR4P").

One or more than one metallocene catalyst may be employed. For example, as described in U.S. Pat. No. 4,530,914, at least two metallocene catalysts may be used in a single catalyst composition to achieve a broadened molecular weight distribution polymer product.

Cocatalyst

An activating cocatalyst capable of activating the metallocene catalyst must also be used in the present system. Preferably, the activating cocatalyst is one of the following: (a) branched or cyclic oligomeric poly(hydrocarbylaluminum oxide)s which contain repeating units of the general formula —(Al(R*)O)—, where R* is hydrogen, an alkyl radical containing from 1 to about 12 carbon atoms, or an aryl radical such as a substituted or unsubstituted phenyl or naphthyl group; (b) ionic salts of the general formula [A$^+$][BR$_4$—], where A$^+$ is a cationic Lewis or Brönsted acid capable of abstracting an alkyl, halogen, or hydrogen from the metallocene catalysts, B is boron, and R is a substituted aromatic hydrocarbon, preferably a perfluorophenyl radical; and (c) boron alkyls of the general formula BR$_3$, where R is as defined above.

Preferably, the activating cocatalyst is an aluminoxane such as methylaluminoxane (MAO) or modified methylaluminoxane (MMAO), or a boron alkyl Aluminoxanes are preferred and their method of preparation is well known in the art. Aluminoxanes may be in the form of oligomeric linear alkyl aluminoxanes represented by the formula:

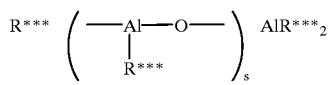

or oligomeric cyclic alkyl aluminoxanes of the formula:

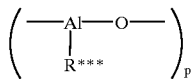

wherein s is 1–40, preferably 10–20; p is 3–40, preferably 3–20; and R* is an alkyl group containing 1 to 12 carbon atoms, preferably methyl or an aryl radical such as a substituted or unsubstituted phenyl or naphthyl radical. In the case of MAO, R* is methyl, whereas in MMAO, R* is a mixture of methyl and C$_2$ to C$_{12}$ alkyl groups wherein methyl comprises about 20 to 80 percent by weight of the R* group.

The amount of activating cocatalyst and metallocene catalyst usefully employed in preparation of the catalyst composition, whether the catalyst composition is formed in situ as it is being introduced into the reaction zone or formed prior to introduction into the reaction zone, can vary over a wide range. When the cocatalyst is a branched or cyclic oligomeric poly(hydrocarbylaluminum oxide), the mole ratio of aluminum atoms contained in the poly (hydrocarbylaluminum oxide) to metal atoms contained in the metallocene catalyst is generally in the range of from about 2:1 to about 100,000:1, preferably in the range of from about 10:1 to about 10,000:1, and most preferably in the range of from about 50:1 to about 2,000:1. When the cocatalyst is an ionic salt of the formula [A$^+$][BR*$_4$—] or a boron alkyl of the formula BR*$_3$, the mole ratio of boron atoms contained in the ionic salt or the boron alkyl to metal atoms contained in the metallocene catalyst is generally in the range of from about 0.5:1 to about 10:1, preferably in the range of from about 1:1 to about 5:1.

The catalyst can be composed of one or more of metal compounds in combination with one or more cocatalysts. Alternatively, all or a portion of the cocatalyst can be fed separately from the metal compound(s) to the reactor. Promoters associated with any particularly polymerization are usually added to the reactor separately from the cocatalyst and/or metal compound(s).

Liquid Catalyst

The metallocene catalysts for use herein are in a liquid form and unsupported. As used herein, "liquid catalyst" or "liquid form" includes neat, solution, emulsion, colloids, suspension and dispersions of the transition metal or rare earth metal component(s) of the catalyst.

If the metal compound and/or the cocatalyst occurs naturally in liquid form, it can be introduced "neat" into the reactor. More likely, the liquid catalyst is introduced into the reactor as a solution (single phase, or "true solution" using a solvent to dissolve the metal compound and/or cocatalyst), an emulsion (partially dissolving the catalyst components in a solvent), suspension, dispersion, or slurry (each having at least two phases). Preferably, the unsupported catalyst employed is a solution or an emulsion, most preferably a solution.

The solvents which can be utilized to form liquid catalysts are inert solvents, preferably non-functional hydrocarbon solvents, and may include aliphatic hydrocarbons such as butane, isobutane, ethane, propane, pentane, isopentane, hexane, heptane, octane, decane, dodecane, hexadecane, octadecane, and the like; alicyclic hydrocarbons such as cyclopentane, methylcyclopentane, cyclohexane, cycloctane, norbornane, ethylcyclohexane and the like; aromatic hydrocarbons such as benzene, toluene, ethylbenzene, propylbenzene, butylbenzene, xylene, tetrahydrofuran and the like; petroleum fractions such as gasoline, kerosene, light oils, and the like; and mineral oil. Likewise, halogenated hydrocarbons such as methylene chloride, chlorobenzene, ortho-chlorotoluene and the like may also be utilized. By "inert" is meant that the material being referred to is non-deactivating in the polymerization reaction zone under the conditions of gas phase polymerization and is non-deactivating with the catalyst in or out of the reaction zone. By "non-functional", it is meant that the solvents do not contain groups such as strong polar groups which can deactivate the active catalyst metal sites.

The concentration of the catalyst and/or cocatalyst that is in solution that is provided to the reactor may be in the range of from about 0.01 to about 10,000 millimoles/liter. Of course, if the catalyst and/or cocatalyst is being used in its neat form, i.e., in its liquid state with no solvent, it will be comprised of essentially pure catalyst and/or cocatalyst, respectively. Liquid flowrates of catalyst, cocatalyst, and activators range between 5 and 250 kg/hr for commercial scale gas-phase reactors.

The catalyst may be fed in a preactivated or prepolymerized form.

Additional Catalysts

In addition to the unsupported metallocene, other catalysts may be added to the system to provide for different product properties.

Examples of suitable catalysts include:

A. Ziegler-Natta catalysts, including titanium based catalysts such as those described in U.S. Pat. Nos. 4,376,062, 4,379,758 and 5,066,737. Ziegler-Natta catalysts are typically are magnesium/titanium/electron donor complexes used in conjunction with an organoaluminum cocatalyst and an external selectivity control agent, such as an alkoxy silane.

B. Chromium based catalysts such as those described in U.S. Pat. Nos. 3,709,853; 3,709,954; and 4,077,904.

C. Vanadium based catalysts such as vanadium oxychloride and vanadium acetylacetonate, such as described in U.S. Pat. No. 5,317,036.

D. Cationic forms of metal halides, such as aluminum trihalides.

E. Cobalt catalysts and mixtures thereof such as those described in U.S. Pat. Nos. 4,472,559 and 4,182,814.

F. Nickel catalysts and mixtures thereof such as those described in U.S. Pat. Nos. 4,155,880 and 4,102,817.

G. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. Neodymium compounds, particularly neodymium neodecanoate, octanoate, and versatate, are the most preferred rare earth metal catalysts.

H. A supported metallocene of the aforementioned type.

Polymers

Illustrative of the stereoregular polymers which can be produced in accordance with the invention are the following: isotactic polypropylene homopolymers and copolymers employing one or more $C_2$ and $C_4$–$C_{12}$ alpha olefins; syndiotactic polypropylene homopolymers and copolymers employing one or more $C_2$ and $C_4$–$C_{12}$ alpha olefins; hemi-isotactic polypropylene homopolymers and copolymers employing one or more $C_2$ and $C_4$–$C_{12}$ alpha olefins; polyisoprene; polystyrene; polybutadiene; polymers of butadiene copolymerized with styrene; polymers of butadiene copolymerized with acrylonitrile; polymers of isobutylene copolymerized with isoprene; ethylene propylene rubbers and ethylene propylene diene rubbers; polychloroprene, and the like. Especially preferred are polypropylene impact copolymers having an isotactic polypropylene homopolymer (which may have some ethylene) with an ethylene-propylene copolymer and propylene random copolymers, i.e., with a comonomer such as butene.

Because of the stereospecificity of the reaction, the polypropylene made hereby has xylene solubles ($X_s$) of less than about 7% w, and preferably less than about 5.5% w, and most preferably less than about 3% w.

Polymerization

The present invention is directed to gas phase polymerization, especially one carried out in a stirred or fluidized bed reactor. The invention can be carried out in a single reactor or multiple reactors (two or more reactors in series). For example, a two sequential reactor system may be used to make a polymer in the first reactor which is tranferred to a second reactor at the same or different reaction conditions (with optionally the addition of more alumoxane), where additional polymer is produced using residual catalyst transferred with the resin. This is particularly usefull for the production of impact copolymers where isotactic polypropylene (which may contain some comonomer) is produced in the first reactor and an ethylene-propylene rubber is produced in the second.

In addition to well known conventional gas phase polymerization processes, "condensed mode", including the so-called "induced condensed mode", and "liquid monomer" operation of a gas phase polymerization can be employed.

A conventional fluidized bed process for producing resins is practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor along with make-up monomer added to the recycle stream, Condensed mode polymerization is disclosed in U.S. Pat. Nos. 4,543,399; 4,588,790; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced; it may also include monomers and comonomers. The condensing fluid can be introduced into the reaction/recycle system at any point in the system. Condensable fluids include saturated or unsaturated hydrocarbons. In addition condensable fluids of the polymerization process itself other condensable fluids, inert to the polymerization can be introduce to "induce" condensing mode operation. Examples of suitable condensable fluids may be selected from liquid saturated hydrocarbons containing 2 to 8 carbon atoms (e.g., propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Condensable fluids may also include polymerizable condensable comonomers such as olefins, alpha-olefins, diolefins, diolefins containing at least one alpha olefin, and mixtures thereof. In condensing mode, it desirable that the liquid entering the fluidized bed be dispersed and vaporized quickly.

Liquid monomer polymerization mode is disclosed, in U.S. Pat. No. 5,453,471, U.S. Ser. No. 510,375, PCT 95/09826 (US) and PCT 95/09827 (US). When operating in the liquid monomer mode, liquid can be present throughout the entire polymer bed provided that the liquid monomer present in the bed is adsorbed on or absorbed in solid particulate matter present in the bed, such as polymer being produced or fluidization aids (e.g., carbon black) present in the bed, so long as there is no substantial amount of free liquid monomer present more than a short distance above the point of entry into the polymerization zone. Liquid mode makes it possible to produce polymers in a gas phase reactor using monomers having condensation temperatures much higher than the temperatures at which conventional polyolefins are produced. In general, liquid monomer process are conducted in a stirred bed or gas fluidized bed reaction vessel having a polymerization zone containing a bed of growing polymer particles. The process comprises continuously introducing a stream of one or more monomers and optionally one or more inert gases or liquids into the polymerization zone; continuously or intermittently introducing a polymerization catalyst into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone. If there is only one monomer present in the gas-liquid stream, there is also present at least one inert gas. Typically, the temperature within the zone and the velocity of gases passing through the zone are such that essentially no liquid is present in the polymerization zone that is not adsorbed on or absorbed in solid particulate matter.

Catalyst Feeding

The catalyst is fed to the reactor in a resin particle lean zone which can be established by feeding the catalyst in any manner such that the catalyst droplets do not immediately contact a substantial portion of the resin particles of the fluidized bed. The droplets of the liquid catalyst are introduced without immediately contacting growing polymer particles of the bed so as to provide an average polymer particle size (APS) ranging from about 0.01 (0.025 cm) to about 0.06 inches (0.15 cm). Generally, the particle density in the particle lean zone is at least 10 times lower than that in the fluidized bed. In the time period elapsing when the liquid catalyst in droplet form leaves the nozzle and contacts the particles in the bed, new polymer particles are formed. The time between the droplet leaving the nozzle and its contacting the particles in the bed ranges from about 0.01 seconds to 60 seconds, preferably about 0.01 to 30 seconds, and, most preferably, is about 0.01 seconds to 5 seconds.

A particle lean zone may be a section of the reactor which normally does not contain the fluidized bed, such as the disengaging section, the gas recirculation system, or the area below the distributor plate. The particle lean zone may also be created by deflecting resin away from the catalyst spray with a stream of gas.

In a preferred embodiment of the present invention, the liquid catalyst in a carrier gas (e.g., nitrogen, argon, alkane, or mixtures thereof) is surrounded by at least one gas which serves to move or deflect resin particles of the bed out of the path of the liquid catalyst as it enters the fluidization zone and away from the area of catalyst entry, thereby providing a particle lean zone. In a particularly preferred embodiment, the liquid catalyst in the carrier gas is surrounded by at least two gases, the first gas serving primarily to deflect resin particles of the bed out of the path of the liquid catalyst and the second gas primarily prevents the injection tube or nozzle tip from getting clogged. As used in this application, when the liquid catalyst in the carrier gas is surrounded by two gases, the catalyst is considered to be shrouded. The first or particle-deflecting gas and the second or tip-cleaning gas can each be selected from the group consisting of recycle gas, monomer gas, chain transfer gas (e.g., hydrogen), inert gas or mixtures thereof. Preferably the particle-deflecting gas is all or a portion of the recycle gas and the tip-cleaning gas is all or a portion of a monomer (e.g., ethylene or propylene) employed in the process.

Liquid catalyst in a carrier gas, particle-deflecting gas, and, when employed, the tip-cleaning gas can be introduced into the reactor at the same velocities to establish a particle lean zone. However, it is preferred that they enter the fluidization zone at differing velocities. Preferably, the liquid catalyst in the carrier gas is introduced at a velocity ranging from about 50 ft/sec (15 m/sec) to about 400 ft/sec (130 m/sec); the particle-deflecting gas is introduced at a velocity ranging from about 10 ft/sec (3 m/sec) to about 150 ft/sec (50 m/sec), and, when employed, the tip-cleaning gas ranges in velocity from about 50 ft/sec (15 m/sec) to about 250 ft/sec (80 m/sec). It is noted that the upper velocity limits may be higher than the recited preferred limits. Each gas has an upper limit of being fed at sonic velocity (331 m/sec in air at 0° C. and atmospheric pressure but different at reactor conditions). Preferably, the pressure of the particle-deflecting gas, and, when employed, the tip-cleaning gas is about 10 psig (2.5 Pa) to about 50 psig (7.0 Pa), preferably about 20 psig (3.0 Pa) to about 30 psig (5.0 Pa), than the pressure of the gas in the fluidization zone of the reactor. Typically, the particle-deflecting gas pressure ranges from about 10 psig (2.5 Pa) to about 50 psig (7.0 Pa); the tip-cleaning gas pressure, when employed, ranges from about 50 psig (7.0 Pa) to 250 psig (27.0 Pa); and the liquid catalyst/carrier gas pressure ranges from about 50 psig (7.0 Pa) to about 250 psig (27.0 Pa). When the particle-deflecting gas is the recycle gas, it is a portion comprising about 5 to about 25 percent of the total recycle flow and is preferably removed from the discharge side of the compressor. When the tip-cleaning gas is the monomer gas, it is a portion comprising about 2 to about 40 percent of the total monomer flow. The catalyst feedstream, particle-deflecting gas and the tip-cleaning gas optionally also can contain one or more antifoulants or antistatic agents known to those skilled in the art. Additionally, catalyst inhibitors (poisons) may be added to any one of these streams. While inert gases (e.g., nitrogen) can be employed in the present invention as the particle-deflecting and tip-cleaning gases, they can be impractical because they require increased reactor venting, thereby decreasing efficiency of monomer usage and increasing cost.

The catalyst can be introduced into the polymerization zone from the side, top, or bottom of the reactor. Side feeding the liquid catalyst is generally preferred, since it requires no or little modification of a conventional commercial reactor. When the catalyst is fed from a side location into the fluidization or polymerization zone of the reactor, it, along with the particle-deflecting gas and optional tip-cleaning gas, preferably enters the bed from a position that is about 10 percent to about 100% percent of the distance from the distributor plate to the top of the bed, most preferably about 10 percent to about 35 percent of the distance from the distributor plate to the top of the polymer bed. When the catalyst is fed from the bottom of the reactor along with the particle-deflecting gas and optional tip-cleaning gas, it preferably enters the fluidized bed from a position that is at or near the center of the distributor plate in the bottom of the reactor to provide a particle lean zone. When the catalyst is introduced from a location in the top of the reactor, it is preferred that it enter in such a manner to avoid polymerization in the expanded zone of the reactor, and, therefore, is released in the reactor at the top or just immediately above the fluidized bed. This allows the catalyst droplets to additionally coat fines which can accumulate as dust above the top of the fluidized bed.

Any catalyst delivery system that is capable of atomizing the liquid catalyst into droplets of the desired size and distribution and avoids plugging of the tip or nozzle can be employed in the present invention. One embodiment of a catalyst delivery system comprises a particle-deflecting gas tube enclosing an optional tip-cleaning gas tube (or alternatively, shroud tube) which in turn encloses a catalyst injection tube. The particle-deflecting gas tube has a sufficient inside diameter for the insertion or mounting of the tip-cleaning gas tube. For a commercial fluidized bed reactor, typically the particledeflecting gas tube has an inside diameter ranging from about 2 inches (5 cm) to about 12 inches (30 cm), preferably about 4 inches (10 cm) to about 6 inches (15 cm). The optional tip-cleaning gas tube, has an outside diameter capable of fitting inside the particle-deflecting gas tube. For a conventional reactor, typically the tip-cleaning gas tube has an inside diameter ranging from about 0.5 inches (1 cm) to about 1.5 inches (4 cm), preferably about 0.75 inches (1.4 cm) to about 1.25 inches (3.3 cm).

The particle-deflecting gas tube can be flush with the inside wall of the reactor or lead edge (top surface) of the distributor plate, or, preferably, it can be extended beyond the inside wall of the reactor or lead edge of the distributor plate into the fluidization zone. When employed the tipcleaning gas tube can be positioned flush with, extended beyond, or recessed in the particle-deflecting gas tube. Most preferably the tip-cleaning gas tube is flush with the particle-deflecting gas tube.

The catalyst injection tube or nozzle can be housed within the particle-deflecting gas tube, but is preferably housed within the tip-cleaning gas tube which is inside the particle-deflecting gas tube. Preferably the catalyst injection tube or nozzle is tapered at its tip to a fine or knife edge to minimize surface area for injector fouling and convenient entry to the reactor vessel. The catalyst injection tube or nozzle is secured or anchored to the inner wall of the particle-deflecting gas tube or preferably to the tip-cleaning gas tube by means of one or more fins or flanges. Stainless steel injection tubing and pneumatic spray nozzles are commercially available in a wide range of internal diameters and thicknesses such that tubing or nozzle size can easily be matched the amount of catalyst solution feed. For a commercial-size fluidized bed reactor, tubing and nozzles having about a ⅛-inch (0.3 cm) inside diameter are employed. The orifice diameter in the spray nozzle tip is in the ranged of from about 0.01 inch (0.025 cm) to about 0.25 inch (0.60 cm), preferably from about 0.02 inch (0.05 cm) to about 0.15 inch (0.40 cm). The orifice diameter of the tip of the injection tube is between about 0.05 inch (0.10 cm) to about 0.25 inches (0.60 cm), preferably between about 0.1 inch (0.25 cm) to about 0.2 inches (0.5 cm). Suitable nozzles can be obtained from Spraying Systems Corporation (Wheaton, Ill.) and can include the ⅛ JJ Series having standard and customized configurations. Other nozzles may include perpendicular flow nozzles as disclosed in copending U.S. patent application Ser. No. 08/1802,230 and effervescent spray nozzles as disclosed in U.S. patent application Ser. No. 08/802,231. For a given liquid catalyst and reactor polymerization conditions the catalyst liquid feed rates can be adjusted by one skilled in the art to obtain the desired droplet size and distribution. The catalyst injection tube or nozzle can be located flush, extended, or recessed with respect to the leading tip edge of the particle-deflecting gas tube and/or optional tip-cleaning gas tube.

In the absence of the tip-cleaning gas tube, the catalyst injection tube or nozzle can be located flush, extended, or recessed with respect to the leading tip edge of the particle-deflecting gas tube. Most preferably it is extended past the particle-deflecting gas tube. When a tip-cleaning gas tube is employed in conjunction with the particle-deflecting gas tube, the catalyst injection tube or nozzle is extended beyond the leading edge of the tip-cleaning gas tube or flush with the leading edge to the tip-cleaning gas tube. Preferably, the catalyst injection tube or nozzle is extended 2 (5 cm) to 4 inches (10 cm) beyond the leading edges of the tip-cleaning gas tube, and the particle-deflecting gas tube.

An exemplary catalyst injection system is shown in FIG. 1. There is the catalyst injection tubing 1 into which the liquid catalyst and catalyst carrier is fed 1a, a packing gland 2, a packing gland bleeder valve 2a, a valve 3, a tipcleaning gas feed tube 4 and line 4a, a particle deflecting gas tube 5 with a feed tube 5a, a reactor nozzle 6, a reactor insert piece 7, a spray tip 8 and a reactor wall 9.

The catalyst preferably is fed to the reactor with the aid of a gas, either combined prior to injection or preferably with an effervescent or perpendicular spray nozzle. Gases for use may be any relatively inert to the catalyst so that there is not blockage in the catalyst nozzle. Exemplary gases include $N_2$, Ar, He, $CH_4$, $CH_2H_6$, $C_3H_8$, $CO_2$, $H_2$, cycle gas. Reactive gases (e.g., olefins or monomers) may be used if the catalyst is activated in the reactor, e.g., the cocatalyst is fed separately. The gas flow rates in the nozzle should be between about 5 and 200 kg/hr., depending upon the reactor size and particle size control as discussed above.

It is preferred that the catalyst feed nozzle be an effervescent spray nozzle or a perpendicular spray nozzle.

Other Material

Non-catalytic liquids may also be delivered to the reactor, e.g., solvents, anti-fouling agents, scavengers, monomers, antistatic agents, secondary alkyls, stabilizers or antioxidants. Some specific examples include methanol, veratrole, propylene oxide, glyme, water, ATMER®-163 antistatic agent (ICI Chemicals), hydrogen, metal alkyls of the general formula $M^3R^5_g$, where $M^3$ is a Group IA, IIA or IIIA metal, $R^5$ is an alkyl or aryl, and g is 1, 2, or 3; zinc alkyls, $CHCl_3$, $CFCl_3$, $CH_3CCl_3$, $CF_2ClCCl_3$, ethyltrichloroacetate, aluminum alkyls, most preferably triisobutylaluminum. The gas in such situations may be the cycle gas in a gas phase reactor that is operating in condensing mode or may be another inert gas, as is used with the delivery of the catalyst. The addition of this liquid can be any where to the reaction system, e.g., to the bed, beneath the bed, above the bed or to the cycle line. The use of these additives is well within the skill of those skilled in the art. These additives may be added to the reaction zone separately or independently from the liquid catalyst if they are solids, or as part of the catalyst provided they do not interfere with the desired atomization. To be part of the catalyst solution, the additives should be liquids or capable of being dissolved in the catalyst solution.

EXAMPLES

Unsupported SIZR4P was used in a gas phase fluid bed reactor system to make isotactic polypropylene. The reactor had a lower section which was 3.0 m high and an inner diameter of 0.34 m and an upper section which was 4.9 m high and an inner diameter of 0.58 m. A yellow five millimolar solution of SIZR4P catalyst in methylene chloride and a colorless cocatalyst solution of 4.5% Akzo-Nobel MMAO Type 3A in isopentane were fed with syringe pumps through ⅛" tubing. The components reacted for approximately two minutes in this tubing. A constant flow of nitrogen catalyst carrier then was added to the orange liquid catalyst before it was sprayed into the side of the reactor. The catalyst injection tube was tapered at its tip to a knife edge and the tube was housed within a tip-cleaning gas tube (though in the present case, the gas flow rate was too low to achieve this tip-cleaning function) which was inside the particle-deflecting gas tube. It was as shown in FIG. 1. The center of the catalyst injection tube was located approximately two feet (0.6 m) above the gas distributor plate. Reactor conditions are given in Table 1 below. Initially, the polymer particle size grew uncontrollably due to deposition of the catalyst solution on the polymer forming in the fluid bed. However, after a substantial increase in the particle-deflecting gas flowrate, the formation of small polymer particles was observed.

TABLE 1

| Drum | SlZR4P/MeCl2 ml/hr | 4.5% MMAO ml/hr | Carrier N2 kg/hr | Tip N2 kg/hr | Deflecting Gas (Atm) | H2/C3 Ratio | C3 (Atm) | Residence Time (hr) |
|---|---|---|---|---|---|---|---|---|
| 88  | 50 | 140 | 3.2 | 1.4 | 0.258 | 0.0036 | 7.1 | 5.0  |
| 89  | 50 | 140 | 3.2 | 1.4 | 0.258 | 0.0036 | 7.1 | 6.9  |
| 90  | 55 | 140 | 3.2 | 1.4 | 0.253 | 0.0036 | 7.0 | 7.2  |
| 91  | 60 | 140 | 3.2 | 1.4 | 0.248 | 0.0037 | 6.9 | 10.0 |
| 92  | 60 | 140 | 3.2 | 1.4 | 0.246 | 0.0037 | 6.8 | 15.0 |
| 93  | 80 | 170 | 3.2 | 1.4 | 0.231 | 0.0037 | 6.4 | 8.4  |
| 94  | 60 | 170 | 3.2 | 1.4 | 0.216 | 0.0034 | 6.0 | 5.8  |
| 95  | 60 | 170 | 3.2 | 1.4 | 0.248 | 0.0030 | 6.9 | 7.8  |
| 96  | 60 | 170 | 3.6 | 1.4 | 0.243 | 0.0030 | 6.7 | 7.3  |
| 97  | 60 | 170 | 2.7 | 1.4 | 0.241 | 0.0027 | 6.7 | 6.4  |
| 98  | 60 | 170 | 2.7 | 1.4 | 0.238 | 0.0022 | 6.6 | 6.4  |
| 99  | 60 | 170 | 4.5 | 1.4 | 0.231 | 0.0022 | 6.4 | 7.5  |
| 100 | 50 | 140 | 4.5 | 1.4 | 0.307 | 0.0022 | 8.5 | 9.7  |
| 101 | 50 | 140 | 4.5 | 1.4 | 0.278 | 0.0022 | 7.7 | 4.2  |
| 102 | 50 | 140 | 4.5 | 1.4 | 0.270 | 0.0018 | 7.5 | 4.9  |
| 103 | 50 | 140 | 4.5 | 1.4 | 0.270 | 0.0018 | 7.5 | 5.0  |
| 104 | 50 | 140 | 4.5 | 1.4 | 0.270 | 0.0021 | 7.5 | 4.9  |
| 105 | 50 | 140 | 4.5 | 1.4 | 0.263 | 0.0021 | 7.3 | 5.2  |
| 106 | 50 | 140 | 4.5 | 1.4 | 0.261 | 0.0021 | 7.2 | 3.4  |
| 107 | 50 | 140 | 4.5 | 1.4 | 0.261 | 0.0021 | 7.2 | 8.8  |
| 108 | 50 | 140 | 4.5 | 1.4 | 0.261 | 0.0021 | 7.2 | 9.7  |

| | % Resin on Screen Mesh | | | | | | | Calc APS | Visual APS | Weight | Melt Flow |
|---|---|---|---|---|---|---|---|---|---|---|---|
| Drum | 10 | 18 | 35 | 60 | 120 | 200 | Pan | (mm) | (mm) | (kg) | (dg/min) |
| 88  | 0.2  | 26.9 | 57.9 | 14.1 | 0.4 | 0.4 | 0.1 | 0.85 |       | 33 | 32.9 |
| 89  | 1.9  | 48.5 | 45.8 | 3.5  | 0.1 | 0.1 | 0.1 | 1.08 |       | 24 | 25.4 |
| 90  | 2.3  | 52.6 | 43.6 | 0.8  | 0.3 | 0.3 | 0.1 | 1.12 |       | 23 | 39.9 |
| 91  | 4.9  | 65.5 | 29.3 | 0.1  | 0.1 | 0.1 | 0.0 | 1.27 |       | 16 | 32.0 |
| 92  | 5.4  | 70.3 | 24.0 | 0.1  | 0.0 | 0.1 | 0.1 | 1.32 |       | 11 | 44.8 |
| 93  | 12.2 | 79.2 | 8.4  | 0.0  | 0.1 | 0.1 | 0.0 | 1.53 |       | 20 | 71.3 |
| 94  | 23.1 | 75.5 | 1.1  | 0.1  | 0.0 | 0.1 | 0.1 | 1.73 |       | 28 | 60.5 |
| 95  | 50.3 | 49.3 | 0.0  | 0.1  | 0.2 | 0.1 | 0.1 | 2.12 |       | 21 | 35.8? |
| 96  | 74.9 | 24.6 | 0.0  | 0.3  | 0.2 | 0.0 | 0.0 | 2.47 |       | 22 | 64.4 |
| 97  | 93.9 | 4.8  | 0.4  | 0.6  | 0.3 | 0.1 | 0.1 | 2.73 |       | 25 | 99.8 |
| 98  | 97.2 | 0.5  | 1.0  | 0.8  | 0.3 | 0.2 | 0.0 | 2.77 |       | 25 | 90.8 |
| 99  | 97.1 | 0.6  | 1.1  | 0.7  | 0.3 | 0.1 | 0.1 | 2.77 | 6.35 | 22 | 91.8 |
| 100 | 95.4 | 1.7  | 1.9  | 0.7  | 0.2 | 0.1 | 0.0 | 2.74 |       | 17 | 62.9 |
| 101 | 93.6 | 2.4  | 2.7  | 0.9  | 0.3 | 0.1 | 0.0 | 2.71 |       | 39 | 57.8 |
| 102 | 60.9 | 24.3 | 12.3 | 1.7  | 0.6 | 0.1 | 0.1 | 2.16 |       | 34 | 28.1 |
| 103 | 27.3 | 56.2 | 13.8 | 1.7  | 0.8 | 0.2 | 0.0 | 1.67 |       | 33 | 16.9 |
| 104 | 33.2 | 56.5 | 7.1  | 2.1  | 0.8 | 0.3 | 0.0 | 1.80 |       | 34 | 16.2 |
| 105 | 7.4  | 45.3 | 3.9  | 2.0  | 1.0 | 0.3 | 0.1 | 2.02 |       | 31 | 17.9 |
| 106 | 59.1 | 34.4 | 3.5  | 2.2  | 0.7 | 0.1 | 0.0 | 2.19 |       | 48 | 18.1 |
| 107 | 69.1 | 25.7 | 2.5  | 1.7  | 0.9 | 0.2 | 0.0 | 2.34 |       | 19 | 18.7 |
| 108 | 83.3 | 13.7 | 1.7  | 1.0  | 0.4 | 0.0 | 0.0 | 2.57 |       | 17 | 19.5 |

We claim:

1. A process for making stereoregular or regioregular polymers comprising feeding an unsupported metallocene catalyst and a cocatalyst in liquid form to a gas phase reactor in a resin lean particle zone within the reactor without immediately contacting growing polymer particles in the reactor to provide an average particle size ranging from about 0.025 to about 0.15 cm (about 0.01 to about 0.06 inches), wherein the metallocene is represented by the formula:

$$(L)_2R^1MX_{(z-2)} \quad (I)$$

wherein M is a metal from groups III to VIII or a rare earth metal of the Periodic Table; L is a π-bonded substituted indenyl ligand coordinated to M; $R^1$ is a bridging group selected from the group consisting of $C_1$–$C_4$ substituted or unsubstituted alkylene radicals, dialkyl or diaryl germanium or silicon groups, and alkyl or aryl phosphine or amine radicals, each X is independently hydrogen, an aryl, alkyl, alkenyl, alkylaryl, or arylalkyl radical having 1–20 carbon atoms, a hydrocarboxy radical having 1–20 carbon atoms, a halogen, $R^2CO_2$—, or $R^2_2NCO_2$—, wherein each $R^2$ is a hydrocarbyl group containing 1 to about 20 carbon atoms; and z is the valence state of M, wherein the liquid catalyst is in a carrier gas surrounded by at least one particle-deflecting gas having a velocity sufficient to deflect resin particles away from the path of the liquid catalyst as it enters the reactor, and at least one tip-cleaning gas, each gas selected from the group consisting of recycle gas, monomer gas, chain transfer gas, and inert gas.

2. A process according to claim 1 wherein the cocatalyst is selected from the group consisting of:

(a) oligomeric linear alkyl aluminoxanes represented by the formula:

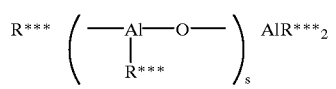

or (b) oligomeric cyclic alkyl aluminoxanes of the formula:

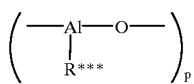

wherein s is 1–40, p is 3–40 and R*** is an alkyl group containing 1 to 12 carbon atoms.

3. A process according to claim 2 wherein s is 10–20.

4. A process according to claim 1 wherein isotactic polypropylene having xylene solubles of less than about 7% is made.

5. A process according to claim 1 wherein a polypropylene impact copolymer is made.

6. A process according to claim 1 wherein a propylene-butene random copolymer is made.

7. The process of claim 1 wherein the liquid catalyst in the carrier gas is introduced at a velocity ranging from about 15 m/s (about 50 ft/s) to the sonic velocity of said gas; the particle-deflecting gas is introduced at a velocity ranging from about 3 m/s (about 10 ft/s) to about the sonic velocity of said gas; and the tip-cleaning gas ranges in velocity from about 15 m/s (about 50 ft/s) to about the sonic velocity of said gas.

8. The process of claim 1 wherein the particle-deflecting gas and the tip-cleaning gas is about 69 to about 345 KPa gauge (about 10 to about 50 psig) higher in pressure than the gas in the reactor.

9. The process of claim 1 wherein the particle-deflecting gas is recycle gas and the tip-cleaning gas is monomer gas.

10. The process of claim 1 wherein the liquid catalyst is introduced by a catalyst delivery system comprising (i) a particle-deflecting gas tube enclosing a catalyst injection tube or nozzle or (ii) a particle-deflecting gas tube enclosing a tip-cleaning gas tube which in turn encloses a catalyst injection tube or nozzle.

* * * * *